D. E. SOMES.

Cooling Room for Preserving Provisions, &c.

No. 1,909. Reissued March 21, 1865.

WITNESSES
A. G. Fenner
W. Hardy

INVENTOR
D. E. Somes

N. PETERS, Photo-Lithographer, Washington, D. C.

UNITED STATES PATENT OFFICE.

DANIEL E. SOMES, OF WASHINGTON, DISTRICT OF COLUMBIA.

IMPROVEMENT IN THE CONSTRUCTION OF ROOMS, CASES, &c., FOR PRESERVING AND TRANSPORTING ARTICLES OF FOOD AND OTHER SUBSTANCES.

Specification forming part of Letters Patent No. 39,967, dated September 15, 1863; antedated July 20, 1862; Reissue No. 1,909, dated March 21, 1865.

*To all whom it may concern:*

Be it known that I, DANIEL E. SOMES, formerly of Biddeford, in the county of York and State of Maine, and now of the city of Washington and District of Columbia, have invented a new and useful Improvement in the Construction of Rooms, Chambers, and Vessels for Cooling and Preserving Fruits and other Articles of Food During Transportation or in Store; and I hereby declare that the following is a full and exact description of the same, reference being had to the accompanying drawings, forming a part of this specification, in which—

Figure 1:
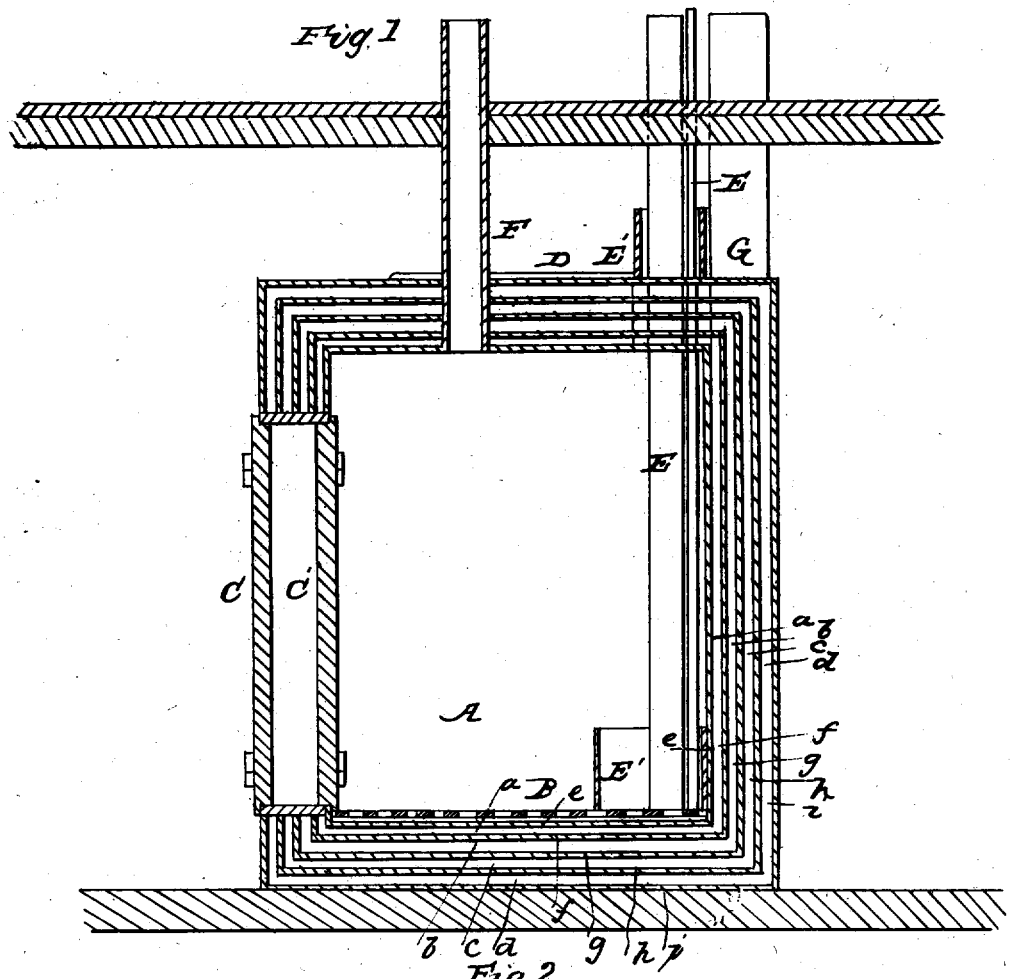
Figure 2:
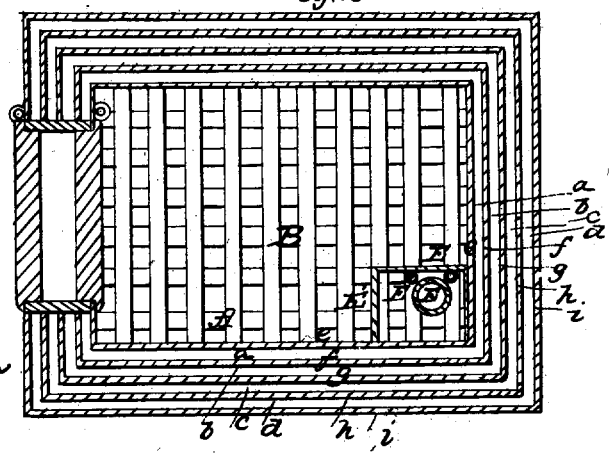

Figure 1 represents a longitudinal vertical section of a room or chamber constructed according to my invention. Fig. 2 is a horizontal section of the same. Similar letters of reference denote like parts in both views.

Previous to my invention the usual mode of carrying articles of food of a perishable nature through long distances and warm climates has been either to pack the articles in ice or to place ice in and around the vessel, box, or chamber inclosing them. These modes are both defective in preserving the article and also expensive. There being no means of regulating the temperature, the article may be frozen at the beginning of the process and not sufficiently cooled before the end of the voyage or journey, and such modes of putting up the articles do not admit of a proper ventilation. There is besides a great waste in the ice used for cooling, and many articles—such as tropical fruits—are injured by being packed in direct contact with melting ice. These objections are overcome by my invention.

The drawings represent my invention applied to a chamber or chest to be stowed between decks in a ship or like vessel suitable for the transportation and preservation of tropical fruits.

In order that the walls of the chamber may be sufficiently light for transportation, readily cooled, and not easily penetrated by heat from the outside, they are made of several—say four or five—thicknesses, with three or four intervening air-spaces, as shown in the drawings, in which *e f g h i* are the multiple walls and *a b c d* the intervening spaces. The spaces *a b c d* communicate by means of a tube, G, with a cooling-vessel, so that the air which enters the spaces may be cooled to any extent desired. The bottom of the provision-room A is covered by lattice-work B, which is slightly elevated, so that the air can circulate under it. Access can be had to the interior of the room by means of double doors C C′ on the side and by a hatchway, D, in the top. The doors C C′ may be so arranged that one opens outward and the other inward, as shown in the drawings, or the inner door may also be made to open outward, which will in many cases be more convenient than the arrangement shown in the drawings.

The hatchway, as well as the doors, ought to be kept closed except when the same must be opened to put some articles into the room or to take them out.

The room A is placed into the hold or lower deck of a vessel, or into the cellar or any part of a building, and it is supplied with fresh air by one or more tubes, E, which extend down below the lattice-work B on the bottom of the room A, and which pass up through the upper deck of the vessel, or through the roof of the building in which the room may be situated. The foul air from the interior of the room is carried off through a pipe, F, which passes through the several partitions on the top of the room A, and up through the upper deck of the vessel, or through the roof of the building in which said room may be situated.

By the aid of the tube or tubes E and pipe F a continuous circulation of fresh air is effected through the interior of the room A, and the articles which may be placed into said room are not endangered by being brought in contact with the foul air generally pervading provision rooms or chambers, for preserving meat or other articles, of the ordinary construction. In order to cool the air as it passes through the tube or tubes E the latter pass through one or more vats E′, which may be situated either inside or outside of the room A, and which are intended to be filled with a mixture of ice and salt or some other suitable cooling mixture or substance.

The air-passages *a b c d* between the several walls of the room are supplied with fresh air by a tube, G, which extends through the top of the room, and which communicates with all the air-passages, as clearly shown in Fig. 1 of the drawings. This tube extends up through the upper deck of the vessel, or through the roof of the building in which the room may be situated, and it may be so arranged that a portion of it can be surrounded with ice, so that a continuous current of cool air is thrown into the air-passages, and that the temperature in the interior of the room is kept sufficiently low to prevent the food or other articles from decaying for a tolerably long time.

Suitable registers may be applied to regulate the supply of air to the room and to the air-passages, the air in the air-passages being intended only as a non-conducting medium to preserve the interior of the room against the influence of the surrounding atmosphere.

A room of this construction will be of particular advantage on vessels of war, or on all other vessels which are intended for long voyages to all parts of the globe, or for the transportation of tropical and other fruits and other food, or ice. It may, however, be used with advantage in hotels or other buildings in which it is desirable to keep on hand a large supply of fresh meat, fruits, and other articles of food.

It is evident that a room or chamber of similar construction may be easily adapted to other modes of transportation as well as that above more particularly described.

Some of the advantages of this mode of transportation and storing of perishable articles over that commonly used are that there is no danger of freezing the articles or spoiling them by direct contact with the ice. The ventilation of the interior of the vessel is easily maintained and the temperature regulated. There is also great economy in the cooling material used.

Having thus described my invention, what I claim, and desire to secure by Letters Patent of the United States, is—

1. A vessel or chamber suitable for transporting or storing articles of food, with multiple walls and air-spaces, and combined with one or more pipes, tubes, or ducts, for the purpose of introducing cold air and for ventilating said vessel or chamber, substantially as described.

2. The combination of the tubes E and F, or their equivalents, with a preserving-vessel, A, as set forth.

3. Connecting with a preserving-vessel or chamber, such as described, a separate apparatus for cooling the air to be introduced into said chamber or vessel for the purpose of lowering the temperature and preserving articles therein contained, substantially as set forth.

D. E. SOMES.

Witnesses:
JNO. D. PATTEN,
N. W. HEILBORN.